Patented Aug. 2, 1932

1,869,930

UNITED STATES PATENT OFFICE

RAINALD BRIGHTMAN, OF MANCHESTER, ENGLAND, ASSIGNOR TO IMPERIAL CHEMICAL INDUSTRIES LIMITED, OF WESTMINSTER, ENGLAND

AZO DYESTUFFS AND METHOD OF PREPARING SAME

No Drawing. Application filed August 7, 1930, Serial No. 473,763, and in Great Britain August 21, 1929.

This invention relates to new azo dyestuffs and the method of their preparation. More particularly it relates to dyes prepared from certain amines or aminothiazoles coupled with a 1-amino-5-naphthol-7-sulphonic acid compound.

According to this invention new azo dyes which have the valuable property of dyeing viscose silk, that is, regenerated cellulose silk, in even shades are obtained by diazotizing an unsulphonated non-carboxylated amine of the benzene or naphthalene series or a sulphonated aminothiazole derivative and coupling with 1-amino-5-naphthol-7-sulphonic acid or an N-substituted derivative thereof. Coupling may be effected either in acid or in alkaline solution, and according to the amino compound diazotized there may be obtained dyestuffs giving red to violet dyeings on viscose silk which are characterized by their even shades.

The general formula for these dyes may be represented as follows:

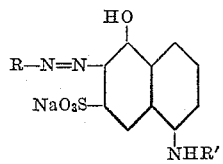

in which R represents an unsulphonated, non-carboxylated aromatic organic radical of the benzene or naphthalene series and R' represents hydrogen or an organic radical.

The invention is illustrated by the following examples, to which however it is not limited. The parts are by weight:—

*Example 1.*—123 parts of o-anisidine are diazotized in the known manner with 69 parts of sodium nitrite and 250 parts of 36% hydrochloric acid, and the diazo solution is stirred into a cold solution containing 239 parts of 1-amino-5-naphthol-7-sulphonic acid and about 400 parts of sodium carbonate. The coupling is maintained cold and alkaline, and when combination is complete, it is heated up and the dyestuff salted out with common salt, giving dark powder which dyes viscose silk a violet shade.

It probably has the following formula:

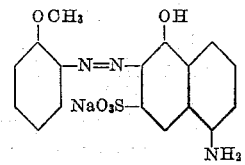

*Example 2.*—319 parts of dehydrothio-p-toluidine sulphonic acid are diazotized with 69 parts of sodium nitrite and 300 parts of 36% hydrochloric acid and the suspension of diazo compound is stirred into a cold solution of 239 parts of 1-amino-5-naphthol-7-sulphonic acid containing about 400 parts of sodium carbonate. After stirring until combination is complete the coupling is heated up and the dyestuff isolated by the addition of common salt. It dyes viscose silk in very even brownish-violet shades.

It probably has the following formula:

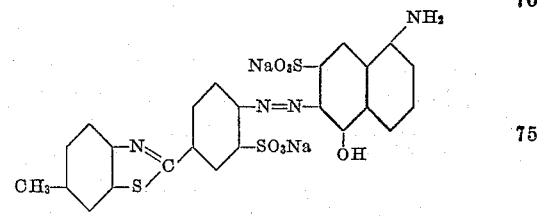

*Example 3.*—143 parts of α-naphthylamine are diazotized in the known manner with 69 parts of sodium nitrite and 300 parts of 36% hydrochloride acid. The diazo solution is stirred into a well cooled solution containing 366 parts of the sodium salt of 1-benzoylamino-5-naphthol-7-sulphonic acid and about 500 parts of sodium acetate. The coupling is maintained neutral to Congo red paper and stirred until combination is complete when it is made alkaline with sodium carbonate and heated up. The dyestuff which is salted out with common salt dyes viscose silk a bluish shade.

It probably has the following formula:

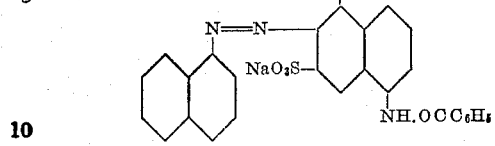

It will be understood that, while the formulas given herein in all probability correctly represent the dyes of the present invention, the invention is wholly independent of the correctness of such formulas.

As many apparently widely different embodiments of this invention may be made without departing from the spirit thereof, it is to be understood that we do not limit ourselves to the foregoing examples or descriptions except as indicated in the following patent claims:

I claim:

1. The process of preparing a monoazo dyestuff which comprises coupling a diazotized aromatic amine of the benzene or naphthalene series selected from the group consisting of such unsulphonated non-carboxylated aryl amines which do not contain a hydroxyl group and sulphonated amino thiazoles with 1-amino-5-naphthol-7-sulphonic acid compounds.

2. The process of claim 1 wherein the amine diazotized is o-anisidine.

3. The process of claim 1 wherein the amine diazotized is dehydro-thio-p-toluidine sulphonic acid.

4. The process of claim 1 wherein the amine diazotized is α-naphthylamine.

5. A dyestuff having the general formula

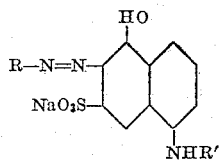

in which R represents an unsulphonated, non-carboxylated aromatic radical of the benzene or naphthalene series not containing a hydroxyl group and R' represents hydrogen or an organic radical of the benzene series.

In testimony whereof, I affix my signature.

RAINALD BRIGHTMAN.